May 7, 1957 G. G. LEWIS 2,791,085
SICKLE KNIFE DRIVE MECHANISM
Filed Sept. 2, 1954 3 Sheets-Sheet 1
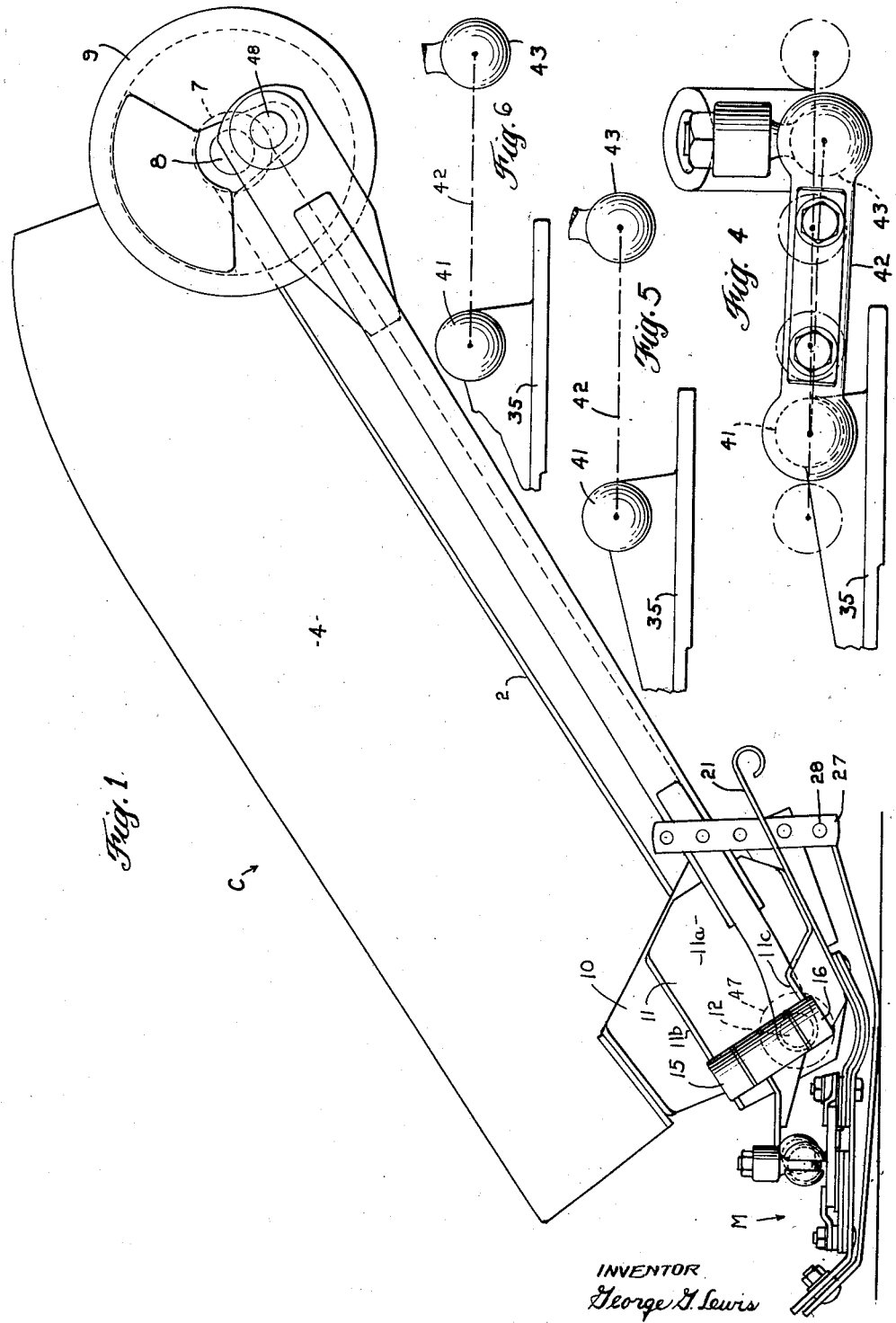
INVENTOR
George G. Lewis
By Richard E. Babcock Jr.
ATTORNEY May 7, 1957 G. G. LEWIS 2,791,085
SICKLE KNIFE DRIVE MECHANISM
Filed Sept. 2, 1954 3 Sheets-Sheet 2
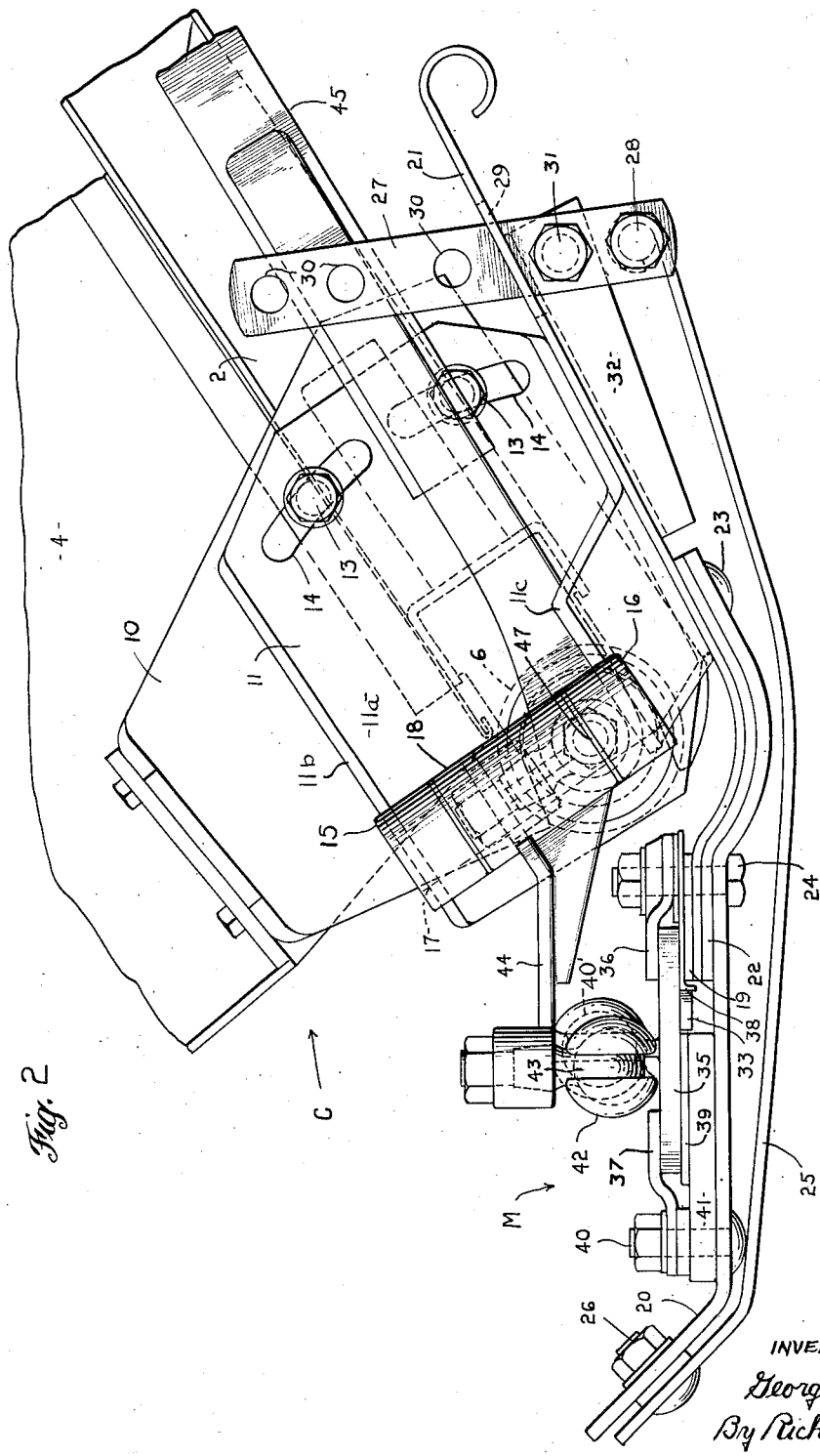
INVENTOR
George G. Lewis
By Richard E. Babcock Jr.
ATTORNEY

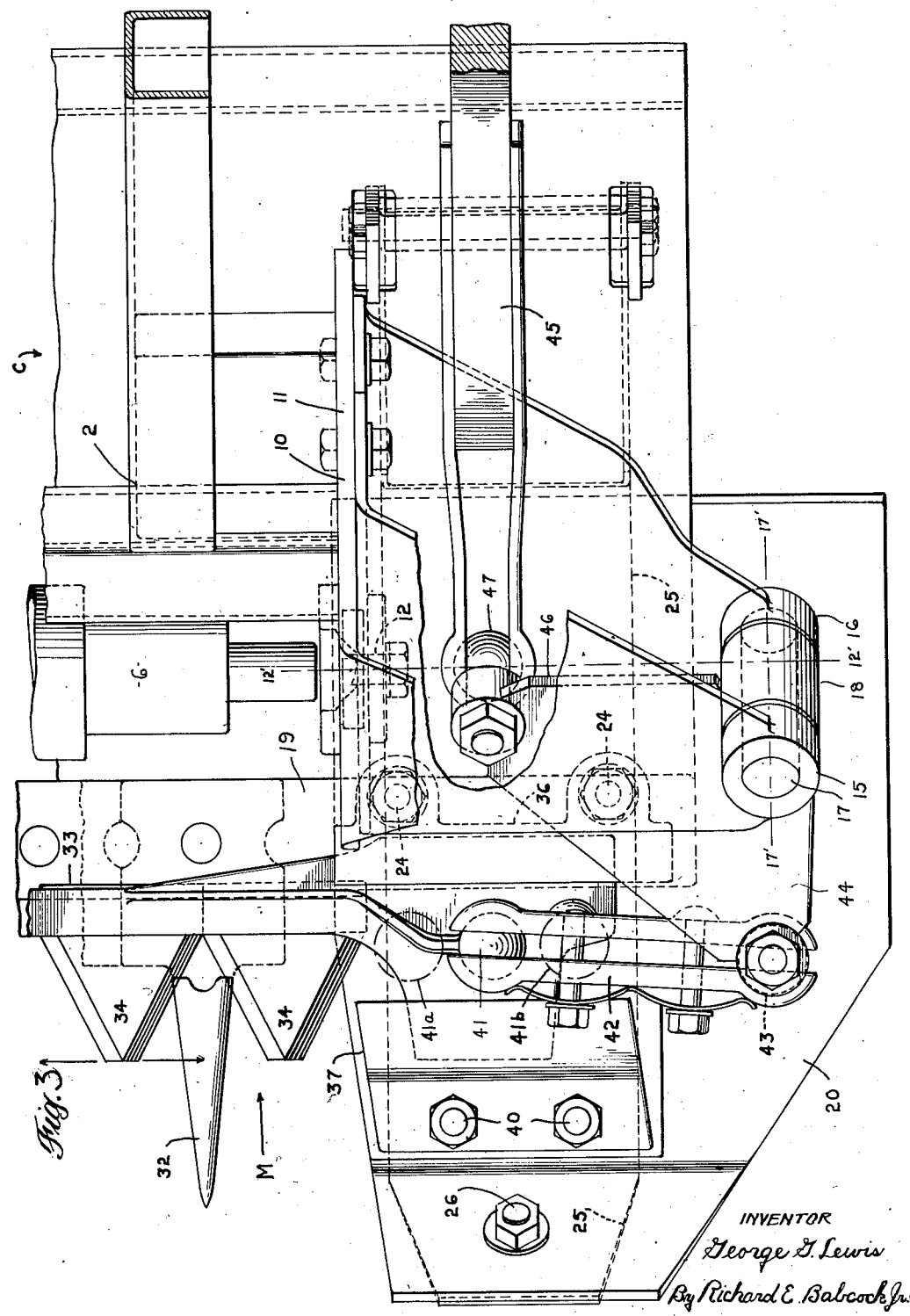

United States Patent Office 2,791,085
Patented May 7, 1957

2,791,085

SICKLE KNIFE DRIVE MECHANISM

George G. Lewis, New Holland, Pa., assignor, by mesne assignments, to Sperry Rand Corporation, New Holland, Pa., a corporation of Delaware Application September 2, 1954, Serial No. 453,914

10 Claims. (Cl. 56—296)

This invention relates to a reciprocating sickle knife drive mechanism for mowers of the class such as are commonly used in connection with harvester units in which reciprocating motion is transmitted to the sickle knife through a bell crank from a pitman reciprocating generally transversely to the sickle knife.

In such a mower it is generally desirable to provide for angularly adjusting or tilting the cutter bar about an axis parallel to the reciprocating movement of its sickle knife in order that the angle of tilt of the cutter bar may be adjusted as necessary to permit its most efficient operation under varying conditions. However, in mowers of the class here under consideration it has been heretofore impossible to accomplish this without so disrupting the relationship between the several components of the knife drive mechanism as to change the locus of reciprocation of the sickle knife and thus destroy the registry between its individual knife sections and the usual finger guards and their ledger knives.

It is the primary object of the instant invention to provide a sickle knife drive mechanism of this class in which the cutter bar may be adjusted to various tilted positions without changing the locus of reciprocation of the sickle knife and its respective knife sections with respect to the finger guards and ledger plates of the cutter bar.

Thus, in accordance with the invention, the cutter bar is carried by a support or supports for angular adjustment about an axis parallel to the horizontal axis of reciprocation of its sickle knife, and means are provided for securing such support in various positions of adjustment. The bell crank, through which the sickle knife is driven, also is mounted on the same support for oscillation about a vertical or vertically inclined axis which intersects the said axis of angular adjustment. The driven arm of the bell crank is disposed for oscillation from any suitable source through a pitman of such length that the connection between the pitman and said driven arm is aligned with the above mentioned axis of adjustment at the mid point of oscillation of the bell crank, such connection being disposed for oscillation in a common plane with said axis. It is the above stated relation between the axis of angular adjustment of the cutter bar, the plane of oscillation of the said connection, and the selection of such range of oscillation of the bell crank as to achieve alignment of the said connection with said axis of angular adjustment at the mid point of oscillation of the bell crank, which is believed responsible for the new and useful results obtained.

Moreover, in such a mechanism where the bell crank oscillates about a vertically inclined axis, it will be apparent that the driving arm of the bell crank which is linked to the sickle knife will oscillate through an arcuate path which will at most times be both vertically and horizontally misaligned with the sickle knife.

It is, accordingly, a further object of the invention to so locate the bell crank and to so select its range of oscillation that at the opposite extremities of its oscillation the link which connects said driving arm of the bell crank to the sickle bar will extend parallel to the sickle bar. By virtue of this arrangement, the driving force which is transmitted to the sickle bar to reverse its direction of movement at the end of each reciprocating stroke will be parallel to the sickle bar and thus will minimize any tendency at such times to displace the sickle bar either laterally or vertically with respect to the cutter bar on which it is guided.

The foregoing objects and advantages are all attained by the preferred embodiment of the invention illustrated in the accompanying drawings in which:

Figure 1 represents a side elevation of a harvester end feed conveyer having a mower supported at the leading end thereof and employing the novel mower drive mechanism of the invention;

Figure 2 is an enlarged elevational view of the mower and its drive mechanism;

Figure 3, a plan view of Figure 2;

Figure 4, a fragmentary end view looking toward the right in Figure 2 and illustrating the position of the connecting link between the bell crank and sickle knife in full lines in an intermediate position and diagrammatically in dot and dash lines in its forward and rearward positions respectively;

Figure 5 is a diagrammatic end view illustrating the left hand position of Figure 4; and, Figure 6, a diagrammatic end view illustrating the right hand position of Figure 4.

In the accompanying drawings, the drive mechanism is illustrated in its preferred application wherein it is employed to drive a mower M supported at the forward end of a conveyer C such as may be supported on and employed in conjunction with a conventional portable harvester unit, to mow crop material and deliver it rearwardly to the harvester unit. In the drawings there is illustrated only that side of the conveyer C which carries the sickle bar drive mechanism of the invention, it being understood that the opposite side will be of generally similar construction in accordance with known practice.

The conveyer C may be of conventional construction embodying a rigid frame 2 having a vertical side such as 4 forming one side of a trough. Journalled transversely across the frame are a pair of longitudinally spaced rollers 6 and 7 adapted to operatively support a feed apron for conveying mowed crop material rearwardly from the mower to a harvester unit.

Since the main harvester unit and its portable main frame constitute no part of the instant invention, they are not illustrated herein although it will be understood that in accordance with usual practice the conveyer C is adapted and intended to be floatingly supported from such a unit in advance thereof for vertical floating movement about a horizontal axis preferably coincident with the axis of its rear roll drive shaft 8. To this end the drive shaft 8 may be used in obvious manner to define a pivotal support for the conveyer C. Rotation may be imparted to the drive shaft 8 through a pulley 9 fixed thereon from any suitable power source.

At its lower forward end the conveyer frame 2 includes a rigid mounting plate 10 on which is pivotally mounted a cutter bar support or bracket 11 for angular adjustment about an axis 12' of a pivot element 12. Suitable means for maintaining this support 11 in various positions of angular adjustment may consist of bolts 13 interconnecting the supports to mounting plate 10 through arcuate slots 14 in the support 11.

The support 11 is generally C-shaped in cross-section, having its medial vertical side portion 11a pivotally secured to the mounting plate 10 at 12 as above mentioned. Supported by its respective upper and lower flanges 11b and 11c, are axially opposed trunnion bearings 15 and 16 respectively which receive a pintle or pivot pin 17. Oscillatably fulcrumed on this pintle 17 for movement about its vertically inclined axis 17' is the bell crank 18 through which motion is transmitted to the sickle knife in the manner hereinafter mentioned.

The mower unit M is rigidly connected to and carried by the pivoted support 11 for angular adjustment with said support. To this end, and as shown in Figure 2, its cutter bar 19, at its end adjacent said support, is rigidly connected to a more or less conventional shoe comprising the upper plate 20, rearward extension 21 and reinforcing plate 22, these all extending beneath and being bolted on or otherwise rigidly secured to the support 11 at 23 as shown. These several plates or elements 20, 21, and 22 are all rigidly connected to the cutter bar 19 by bolts 24. A lower plate or skid 25 of stiffly flexible metal has its forward end connected at 26 to upper plate 20. Its rear end is adjustably spaced beneath the said plate 20 by struts 27 having their lower ends pivotally connected to the rear end of the skid at 28. The upper ends of these same struts are disposed for endwise adjustment through slots 29 in the extension plate 21 and are provided with a series of perforations 30 extending lengthwise thereof whereby bolts 31 may be passed through any of such perforations 30 to secure the respective struts to the side flanges of a bracket 32 fixed beneath the extension plate 21. Flexibility of the skid 25 about its forward connection 26 will permit raising or lowering of its rear end portion by adjustment of the struts 27 as may be desired to vary the cutting height of the mower.

Secured at uniform intervals along the cutter bar are usual guard fingers 32, and guided thereon for reciprocation parallel to the axis of angular tilting adjustment 12' of the cutter bar is the usual stickle knife 33 including knife sections 34 which are disposed for coaction with the guard fingers 32 of the cutter bar in usual manner. In accordance with usual practice the several knife sections 34 are so positioned with respect to the guard sections 32 that at the mid point of their reciprocation they lie between the respective guard fingers in the relative positions illustrated in Figure 3. However, at both extremities of their reciprocation these knife sections are in registering relation with the respective guard fingers or guards 32. It is, of course, highly desirable to maintain this relationship at all times and in all angularly adjusted positions of the cutter bar 19 in order to secure the most efficient functioning of the mower. The hereinafter described sickle bar drive mechanism makes this possible.

Fixed on the end of the sickle bar 33 is a rigid driving extension or bracket 35, the laterally opposed side edges of which are slideably guided beneath usual hold-down plates 36 and 37 and rest on more or less conventional wear plates 38 and 39. (See Figure 2.) The wear plate 38 and hold-down plate 36 are preferably secured in position on the cutter bar 19 by the bolts 24 above mentioned, while the hold down plate 37 is bolted at 40—40 to the upper shoe plate 20. A spacer 40' is interposed between the upper plate 20 and wear plate 39; it enables the latter to support the sickle bar extension 37 in proper position.

Rigidly supported on the sickle bar drive bracket or extension 35 is a universal ball element 41 adapted for connection by the mating halves of link 42 to a similar ball element 43 carried on the drive arm 44 of bell crank 18, which it will be recalled is oscillatable on the support 11 about the vertically inclined axis 17' of pintle 17. It is of importance to note that this axis of oscillation 17' intersects the axis of angular adjustment 12' of the cutter bar, as is illustrated in Figure 3, and thus is in a common plane therewith.

Oscillation is transmitted to the bell crank 18 by a pitman 45 having one end connected to the driven arm 46 of the bell crank through a universal ball and socket connection 47 which, in addition to permitting normal operating movement between these parts, also permits tilting of the support 11 and thus of the axis of oscillation 17' of the bell crank without disrupting such connection.

It is of further importance that the connection 47 between the pitman 45 and bell crank driven arm 46 is disposed for oscillation in a common plane with the axis 12' of angular adjustment of the cutter bar.

The pitman 45 operatively connects driven arm 46 of the bell crank to a driving link 48 which may be advantageously secured on the horizontal drive shaft for rotation therewith, thus to be driven together with said shaft from the pulley 9.

The length of the pitman 45 is such that the connection 47 thereof with the driven arm 46 is aligned with the axis of angular adjustment 12' of the mower at the mid-point of oscillation of the bell crank as illustrated in Figure 3.

Due to the location of the axes 12' and 17' in a common plane and the location of connection 47 in alignment with the axis 12' when driven arm 47 is at the mid point of its oscillating movement, or in other words is half-way between the extremities of such movement, it will be readily apparent that such relationship will be unaffected by angular adjustment of the bell crank 18 and mower M about axis 12'. The only effect of such adjustment will be to slightly change the amplitude of oscillation of the bell crank 18 as an incident to the changed angular relationship between the pitman 45 and the plane in which driven arm 46 oscillates. While this will slightly change the amplitude of the reciprocation of the sickle bar 33 such change will normally be of insufficient extent to materially affect the cooperation between the sickle knife sections 34 and guard fingers 33, particularly since the locus of the range of reciprocation of the sickle knife will remain unaffected.

Since the upper portion of the axis 17' is tilted forwardly, it is apparent that the drive arm 44 of the bell crank will oscillate through an arcuate path in a plane diagonal to the horizontal plane in which the sickle bar reciprocates. This will cause the connecting link 42 to be disposed at most times at an angle to the reciprocation of the sickle knife. If the reversal of movement of the sickle knife 33 were to occur at such times, as has been common in prior sickle drives, the inertia of the knife reacting against the relatively angularly disposed link 42 would create strong forces tending to displace the sickle knife from its path of reciprocation. This, in turn, would result in noisy operation and accelerated wear of parts.

Therefore, in accordance with the present invention, the location of the bell crank 18, the position and amplitude of the range of oscillation imparted thereto by the pitman 45, are so selected that at the opposite extremities of its oscillation the link 42 which connects the bell crank and sickle bar via the ball joints 41 and 43 respectively, is disposed in a horizontal position parallel to the sickle knife 33. This is best illustrated in Figures 5 and 6 respectively wherein the ball joint 41 of the sickle bar is respectively disposed at opposite extremities of its range of oscillation in positions corresponding to the broken line showings 41a and 41b respectively in Figure 3. In such positions it will be seen by reference to Figures 3, 4, and 6 that the two balls 41 and 43 and the link 42 connecting them are in horizontal alignment in a direction parallel to the sickle knife 33. Figure 4, on the other hand, illustrates how the link 42 is out of parallelism with sickle knife 33 in an intermediate position between the extremities of the sickle knife reciprocation.

It will thus be apparent that the invention provides a novel drive mechanism of the type under consideration permitting angular tilting adjustment of the mower without destroying the registry between the sickle knife sections and the guard fingers of the cutter bar. Moreover, by virtue of the arrangement above described the driving forces transmitted to the sickle bar at the extremities of its reciprocating movement are always parallel to its reciprocation, with resulting quietness of operation and reduction in wear on the mower parts.

In this application I have shown and described only the presently preferred embodiment of the invention simply by way of illustration of the preferred mode of carrying out the invention as by law required. However, I recognize that the invention is capable of other embodiments and that its several details may be modified in various ways, all without departing from the invention. Accordingly, the drawings and description herein are intended to be merely illustrative and not exclusive.

I claim:

1. A mower comprising a rigid frame, a support pivotally carried by said frame for angular adjustment about a horizontal axis, means adjustably connecting said support to said frame for securing said support in various positions of angular adjustment, a cutter bar connected to said support for angular adjustment therewith, and a sickle knife guided on said bar for reciprocation parallel to said axis of angular adjustment, in combination with a bell crank mounted on said support for oscillation about a vertically inclined axis intersecting said axis of angular adjustment, power driven means oscillating said bell crank through a predetermined range of oscillation comprising a drive crank rotatable about an axis parallel to said axis of angular adjustment, a pitman operatively connecting said one arm to the drive crank, the length of the pitman and the position of its connection to the bell crank and the throw of the crank being such that the connection between said bell crank and the pitman is aligned with said axis of angular adjustment at the mid point of oscillation of the bell crank, whereby adjustment of said support about its axis of angular adjustment will not displace the locus of oscillation of the bell crank, and means interconnecting the bell crank and sickle knife to cause reciprocation of the latter.

2. The combination of claim 1 wherein the connection between said pitman and the bell crank is of the universal type.

3. The combination of claim 1 wherein said interconnecting means comprises an arm of said bell crank extending at right angles to said one arm, a rigid link connecting said other arm to the sickle knife, the range of oscillation of said bell crank and its position relative to the sickle knife being such that at its extremities of oscillation said link extends parallel to the reciprocation of the sickle knife.

4. A mower comprising a rigid frame, a support pivotally carried by said frame for angular adjustment about a horizontal axis, means adjustably connecting said support to said frame for securing said support in various positions of angular adjustment, in combination with a bell crank mounted on said support for oscillation about a vertically inclined axis intersecting said axis of angular adjustment, power drive means oscillating said bell crank through a predetermined range of oscillation comprising a drive crank rotatable about an axis parallel to said axis of angular adjustment, and a pitman operatively connecting said bell crank to the drive crank, the length of the pitman, the position of the connection between the bell crank and pitman and the throw of the crank being such that the connection between said bell crank and the pitman is aligned with said axis of angular adjustment at the mid point of oscillation of the bell crank, whereby adjustment of said support about its axis of angular adjustment will not displace the locus of oscillation of the bell crank.

5. A mower comprising a rigid frame, a support pivotally carried by said frame for angular adjustment about a horizontal axis, a cutter bar connected to said support for angular adjustment therewith, and a sickle knife guided for reciprocation on the cutter bar parallel to said axis of angular adjustment, in combination with a bell crank mounted on said support for oscillation about a vertically inclined axis intersecting said axis of angular adjustment, power driven means oscillating said bell crank through a predetermined range of oscillation comprising a drive crank rotatable about an axis parallel to said axis of angular adjustment, a pitman operatively connecting said bell crank to the drive crank, the length of the pitman, the position of the connection between the bell crank and pitman and the throw of the crank being such that the connection between said bell crank and the pitman is aligned with said axis of angular adjustment at the mid-point of oscillation of the bell crank, whereby adjustment of said support about its axis of angular adjustment will not displace the locus of oscillation of the bell crank, and means interconnecting the bell crank and sickle knife to cause reciprocation of the latter.

6. A mower comprising a rigid frame, a support pivotally carried by said frame for angular adjustment about a horizontal axis, a bell crank mounted on said support for oscillation about an axis transversely to and intersecting said axis of angular adjustment, power driven means oscillating said bell crank through a predetermined range of oscillation comprising a drive crank, and a pitman operatively connecting said bell crank to the drive crank, the position of the connection between the bell crank and pitman, the length of the pitman and the position and throw of the crank being such that the connection between said bell crank and the pitman is aligned with said axis of angular adjustment at the mid point of oscillation of the bell crank.

7. A mower comprising a rigid frame, a support pivotally carried by said frame for angular adjustment about a horizontal axis, a bell crank mounted on said support for oscillation about a vertically inclined axis intersecting said axis of angular adjustment, a pitman operatively universally connected to one arm of said bell crank, means carried by the frame for reciprocating said pitman, the locus and range of oscillation of the bell crank being such that the connection between said one arm and pitman is aligned with said axis of angular adjustment at the mid point of oscillation of the bell crank.

8. The combination of claim 7 including means adjustably connecting said support to said frame for securing said support in various positions of angular adjustment.

9. The combination of claim 7 including means adjustably connecting said support to said frame for securing said support in various positions of angular adjustment, a cutter bar connected to said support for angular adjustment therewith, a sickle knife guided for reciprocation on the cutter bar parallel to said axis of angular adjustment, and means interconnecting the bell crank and sickle knife to cause reciprocation of the sickle knife.

10. The combination of claim 7 including a cutter bar connected to said support for angular adjustment therewith, a sickle knife guided for reciprocation on the cutter bar parallel to said axis of angular adjustment, and means interconnecting the sickle knife to the bell crank to cause reciprocation of the sickle knife responsive to oscillation of the bell crank.

References Cited in the file of this patent
UNITED STATES PATENTS 2,621,521   Lewis et al. _____ Dec. 16, 1952